US010382511B2

(12) United States Patent
Archambault et al.

(10) Patent No.: US 10,382,511 B2
(45) Date of Patent: Aug. 13, 2019

(54) SYNCHRONIZING PLAYBACK OF DIGITAL MEDIA CONTENT

(71) Applicant: Amp Me Inc., Outremont, QC (CA)

(72) Inventors: Martin-Luc Archambault, Montréal (CA); Andrè-Philippe Paquet, Montréal (CA); Martin Gagnon, Lévis (CA); Daniel Levesque, Lévis (CA); Keith Beaudoin, Québec City (CA); Luc Bernard, Québec City (CA); Marc Mercier, Québec City (CA); Michaël Mimeault, Montréal (CA); Rami Kuret, Montréal (CA); Julien Gobeil Simard, Québec City (CA)

(73) Assignee: AMP ME INC., Outremont, QC (CA)

( * ) Notice: Subject to any disclaimer, the term of this patent is extended or adjusted under 35 U.S.C. 154(b) by 303 days.

(21) Appl. No.: 15/441,020

(22) Filed: Feb. 23, 2017

(65) Prior Publication Data
US 2017/0251040 A1    Aug. 31, 2017

Related U.S. Application Data

(60) Provisional application No. 62/299,900, filed on Feb. 25, 2016.

(51) Int. Cl.
*G06F 15/16* (2006.01)
*H04L 29/06* (2006.01)
(Continued)

(52) U.S. Cl.
CPC .......... *H04L 65/601* (2013.01); *H04L 43/106* (2013.01); *H04L 65/4076* (2013.01);
(Continued)

(58) Field of Classification Search
CPC ........................................................ G06F 1/12
See application file for complete search history.

(56) References Cited

U.S. PATENT DOCUMENTS 7,392,102 B2   6/2008  Sullivan et al.
8,677,002 B2   3/2014  Rajapakse
(Continued)

FOREIGN PATENT DOCUMENTS

WO   WO 2005013047   2/2005

OTHER PUBLICATIONS

PCT International Search Report and Written Opinion for PCT/CA2017/050226, dated Jun. 19, 2017, 10 Pages.

*Primary Examiner* — Hamza N Algibhah
(74) *Attorney, Agent, or Firm* — Fenwick & West LLP

(57) ABSTRACT

A guest digital device joins a playback session hosted by a host digital device and synchronizes playback of digital media content with playback on the host digital device. This enables multiple users to listen to or view media at the same time on their respective devices. A time-based synchronization process may be used to initially synchronize playback of the guest digital device to the host digital device. If synchronization is lost, the device may record and analyze audio during playback and a fingerprint-based synchronization approach may be applied that detects a time offset between fingerprints in the analyzed audio. If synchronization is still not achieved, a watermark-based synchronization approach may be applied in which watermarks are actively injected into the audio and the time offsets between the watermarks is detected.

20 Claims, 8 Drawing Sheets

(51) Int. Cl.
   *H04L 12/26*    (2006.01)
   *H04N 21/43*    (2011.01)
   *H04N 21/8547*  (2011.01)
   *G10L 19/018*   (2013.01)

(52) U.S. Cl.
   CPC ....... *H04L 65/604* (2013.01); *H04N 21/4305* (2013.01); *H04N 21/4307* (2013.01); *H04N 21/8547* (2013.01); *G10L 19/018* (2013.01)

(56) References Cited

U.S. PATENT DOCUMENTS

| | | |
|---|---|---|
| 8,817,183 B2 | 8/2014 | Oostveen et al. |
| 9,210,204 B2 | 12/2015 | Crowe et al. |
| 9,237,324 B2 | 1/2016 | Lee et al. |
| 2005/0286546 A1 | 12/2005 | Bassoli et al. |
| 2006/0149850 A1* | 7/2006 | Bowman ................ G11B 27/10 709/231 |
| 2010/0103781 A1* | 4/2010 | Rai ........................ G06F 1/12 368/55 |
| 2011/0276333 A1 | 11/2011 | Wang et al. |
| 2011/0276648 A1* | 11/2011 | Soldan ................... G06F 1/12 709/208 |
| 2012/0102006 A1* | 4/2012 | Larson ................ G06F 16/1865 707/703 |
| 2013/0174204 A1 | 7/2013 | Coburn et al. |
| 2014/0068315 A1* | 3/2014 | Aweya .................... G06F 1/04 713/503 |
| 2014/0222962 A1* | 8/2014 | Mao .................. H04N 21/4305 709/219 |
| 2014/0359075 A1 | 12/2014 | Amidei et al. |
| 2016/0277888 A1* | 9/2016 | Niesen ............... H04L 43/0852 |
| 2017/0181113 A1* | 6/2017 | Keyser-Allen .... H04W 56/0015 |
| 2017/0251040 A1* | 8/2017 | Archambault ........ H04L 43/106 |

\* cited by examiner

SYNCHRONIZING PLAYBACK OF DIGITAL MEDIA CONTENT

RELATED APPLICATIONS

This application claims the benefit of U.S. Provisional Application No. 62/299,900 filed on Feb. 25, 2016, which is incorporated by reference herein.

BACKGROUND

Field of the Invention

The present disclosure relates to synchronizing playback of digital media content on a plurality of digital devices.

Description of Related Art

Digital devices such as mobile phones, tablets, and laptops enable users to play digital media content stored on the device or accessed via a network. In a group setting, different users may want to concurrently play the same media content on their respective devices in a synchronized fashion. However, even if users attempt to start playback on two or more digital devices at the exact same time, the playback of the media content will generally not actually start synchronously or remain synchronized throughout playback. Various factors may contribute to the loss of synchronization of the media content being played on the different devices including, for example, differences in timing of when the respective devices receive a playback start command, differences in the time for each respective device to handle the command, differences in network latency (particularly when the devices are on different networks), differences in decoding times, and differences in buffering times. These and other differences cause undesirable delays between playback of the digital content on each device which results in an undesirable user experience.

SUMMARY

Figure 1:
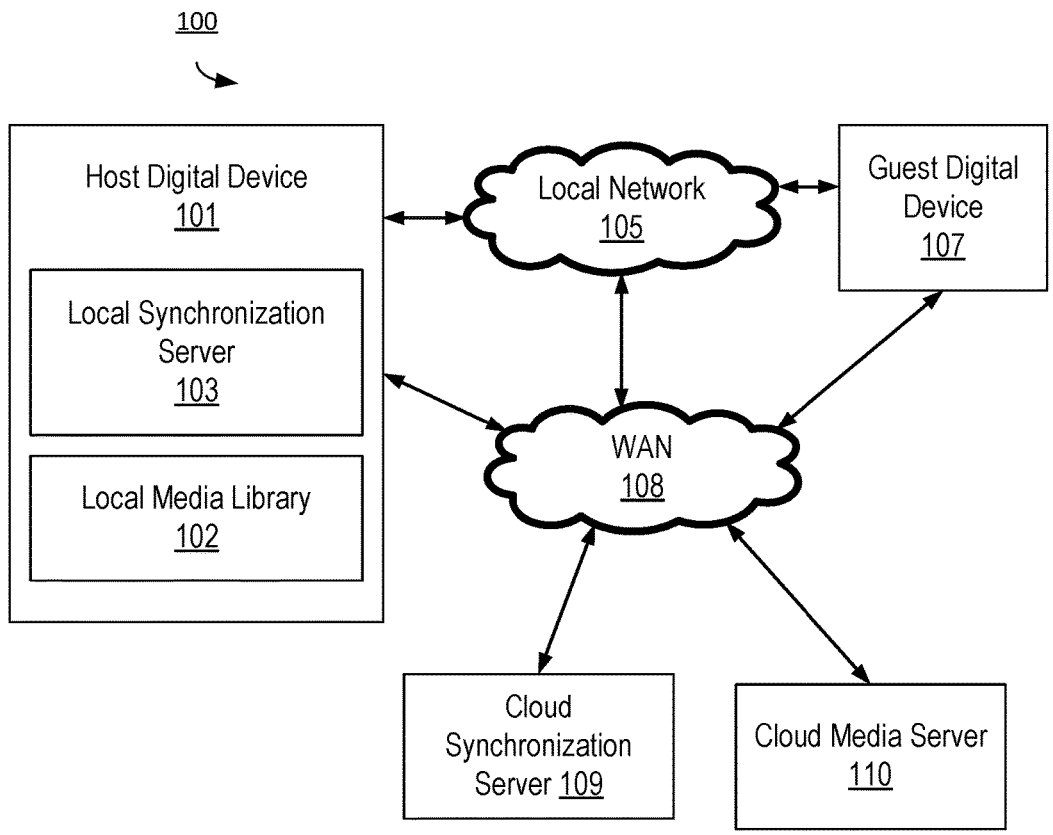
FIG. 1 comprises an example embodiment of a computing network.

A computing device includes a non-transitory computer-readable storage medium that stores instructions for executing a method of synchronizing playback of guest media content played by a guest digital device with playback of host audio media content played on a host digital device. The guest digital device determines a time delta representing an offset between a local system clock of the guest digital device and a reference clock. The guest digital device receives playback information specifying media content being played by the host digital device, a media playback start time representing a start time of the media playback on the host digital device relative to the reference clock, and a media playback session script. The media playback session script comprises a media sequence indicating a sequence of frames of the media content. Based on the media playback start time, the a current time of the local system clock of the guest digital device, and the media playback session script, the guest digital device determines an estimated playback position of the host digital device within a current media sequence. A latency of the guest digital device is also determines that represents a time between initializing playback of a media sequence and outputting the media sequence. The device adjusts the estimated playback position of the guest digital device to compensate for the time delta and the latency to generate a time-adjusted playback position. The media content is played on the guest digital device according to the playback session script and the time-adjusted playback position.

Responsive to detecting a lack of synchronization between playback of the media content from the guest digital device and the host digital device, the guest digital device records ambient audio during playback and identifies timing of features (e.g., fingerprints) in the host and guest audio signals. Playback position may then be adjusted based on the time difference between corresponding features.

Responsive to further detecting a lack of synchronization between playback of the media content from the guest digital device and the host digital device, the guest digital device and host digital device may actively inject watermarks in the audio with predefined timing. The guest digital device records ambient audio during playback and identifies timing of the watermarks in the host and guest audio signals. Playback position may then be adjusted based on the time difference between corresponding watermarks.

DETAILED DESCRIPTION

The disclosure herein provides a method, non-transitory computer-readable storage medium and system for synchronizing playback of digital media content on multiple digital devices such as smartphones, digital music players, and tablets. For example, one or more guest devices may join a playback session hosted by a host device and playback of the digital media content on the one or more guest devices are synchronized to playback on a host device. This enables multiple users to listen to media at the same time on their respective devices.

FIG. 1 is an example computing network environment 100 for enabling synchronized playback of digital media content. The computing network environment 100 comprises a host digital device 101, a guest digital device 107, a cloud synchronization server 109, a cloud media server 110, a local network 105, and a wide area network 108 (WAN) that may include the Internet. The host digital device 101 and the guest digital device 107 may each comprise a computing device such as a smartphone, tablet, personal computer, or video game console. The host digital device 101 and the guest digital device 107 may each include a respective processor and a non-transitory storage medium that stores instructions (e.g., embodied as one or more applications) that when executed by the processor cause the processor to carry out the functions attributed to the digital devices 101, 107 described herein. For example, the host digital device 101 and the guest digital device 107 may each execute a multimedia application that enables the devices 101, 107 to access and play digital media content. Furthermore, the host digital device 101 and the guest digital device 107 may each include an integrated audio playback system or an interface for connecting to an external audio playback system such as Bluetooth speakers, amplifiers, or other wired or wireless sound systems.

The host digital device 101 comprises a local media library 102 and a local synchronization server 103. The local media library 102 is an application that stores and provides access to media content stored on a local storage of the host digital device 101. For example, the media content may be in the form of an audio file or a video file. The media content may be accessed and played by the host digital device 101. Furthermore, media content stored in the local media library 102 may be made available to the guest digital devices 107 via the local network 105 or via the wide area network 108.

The local synchronization server 103 facilitates communications between the host digital device 101 and other connected devices (such as the guest digital device 107, the cloud synchronization server 109, and the cloud media server 110). If a connection to the WAN 108 is available, the local synchronization server 103 may communicate with the cloud synchronization server 109 to enable the cloud synchronization server 109 to coordinate a synchronized playback session between connected devices. If a connection to the WAN 108 is not available, the local synchronization server 103 may directly coordinate the synchronized playback session. As will be described in further detail below, the local synchronization server 103 can initiate a media playback session that the guest digital device 107 can then access and join.

As a shown in FIG. 1, the host digital device 101 and the guest digital device 107 may be connected to the same local network 105 that facilitates communication between connected devices. Furthermore, the host digital device 101 and the guest digital device 107 may have access to a wide area network 108 (that may include the Internet). Connections to the local area network 105 and the wide area network 108 may be facilitated via, for example, a WiFi connection, a cellular network connection, or other wired or wireless connection. In some embodiments, the guest digital device 107 and the host digital device 101 have access to the local network 105 but not the wide area network 108. In another embodiment, the guest digital device 107 has access to the local network 105 only (but not the wide area network 108) and the host digital device 101 has access to both the local network 105 and the wide area network 108. In yet another embodiment, both the host digital device 101 and the guest digital device 107 have access to the wide area network 108.

The cloud synchronization server 109 and a cloud media server 110 may be accessible to the host digital device 101 and the guest digital device 107 via the wide area network 108. The cloud synchronization server 109 and cloud media server 110 may include one or more processors and a non-transitory storage medium that stores instructions (e.g., one or more applications) that when executed by the one or more processors cause the one or more processors to carry out the functions attributed to the cloud synchronization server 109 and the cloud media server 110 described herein. The cloud synchronization server 109 and cloud media server 110 may reside at physically separate locations or may be integrated at the same location.

The cloud synchronization server 109 provides functionality similar to the local synchronization server 103 described above and operates to facilitate synchronization between playback of media content on the host digital device 101 and the guest digital device 107. Particularly, the cloud synchronization server 109 may enable the host digital device 101 to establish a playback session and may enable the guest digital device 107 to access and join the playback session. During playback, the cloud synchronization server 109 may supply timing data to enable the guest digital device 107 to start and stay in synchronization with playback on the host digital device 101.

The local synchronization server 103 and the cloud synchronization server 109 may selectively be used depending on the networking capabilities available to the host digital device 101 and the guest digital device 107. For example, if the host digital device 101 and the guest digital device 107 are capable of communicating via the local network 105 only, then the local synchronization server 103 may be used. Alternatively, if the host digital device 101 and the guest digital device 107 are capable of communicating via the wide area network 108, the cloud synchronization server 109 may be used.

The cloud media server 110 stores and enables access to an online library of media content that can be accessed by the host digital device 101 and the guest digital device 107. For example, instead of playing media content stored locally in the local media library 102, the host digital device 101 may access and stream media content from the cloud media server 110. During a synchronized playback session, the guest digital device 107 may access and stream the same media content from the cloud media server 110 with playback controlled to be synchronized with playback on the host digital device 101.

In an embodiment, the guest digital device 107 may be able to communicate with the host digital device 101 through various mechanisms such as, but not limited to, http, websocket or REST API endpoints. Furthermore, the guest digital device 107 and the host digital device 101 may each be able to communicate with the cloud synchronization server 109 by a variety of communication mechanisms such as http, websocket or REST API endpoints. In an embodiment, the cloud synchronization server 109 also communicates with the cloud media server 110 through the internet through various protocols such as, but not limited to, REST API endpoints or http streaming.

Although only a single guest digital device 107 is illustrated in FIG. 1, an example system may include multiple guest digital devices 107 that each synchronize media playback to playback of the host digital device 101 during a commonly joined playback session.

Figure 2:
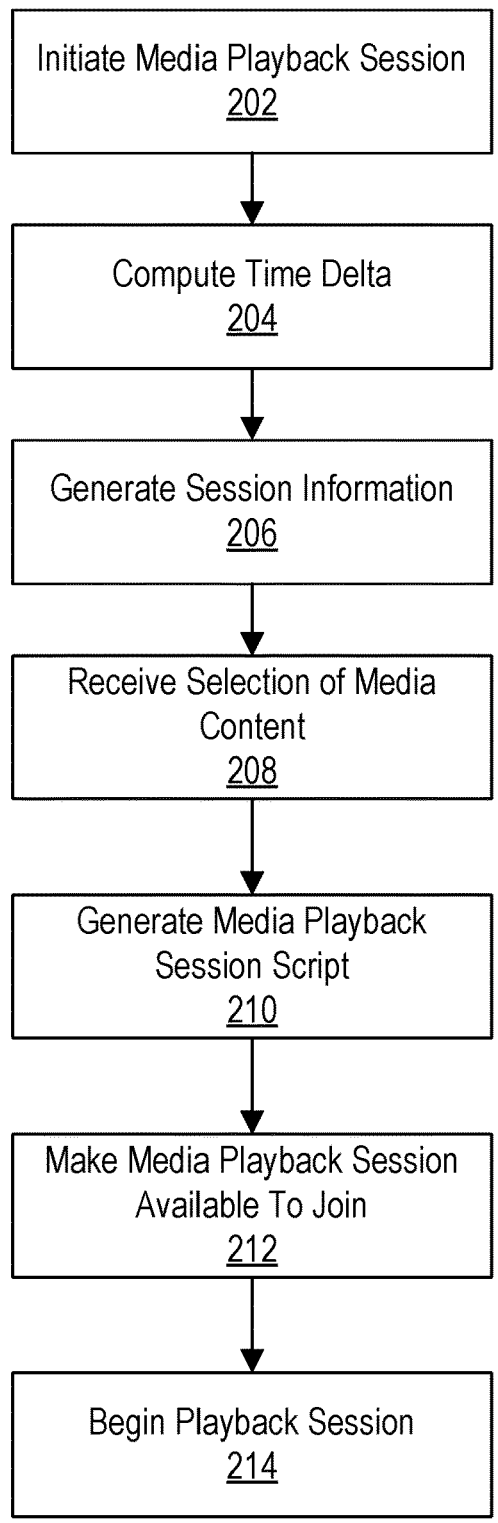
FIG. 2 is a flowchart illustrating an embodiment of a process for creating a media playback session.

FIG. 2 illustrates an embodiment of a process performed by the host digital device 101 for creating a media playback session to which one or more guest digital devices 107 may synchronize media playback. A host digital device 101 initiates 202 a media playback session. For example, the host digital device 101 may initiate the session in response to receiving a request from a user input or from an application executing on the host digital device 101. The host digital device 101 may initiate the media playback session either on the local synchronization server 103 or the cloud synchronization server 109 depending on whether or not internet access is available. For example, in one embodiment, the host digital device 101 may attempt to ping the cloud synchronization server 109 or other remote server and determine if internet access is available depending on whether or not a response is received. The host digital device 101 then initiates the media playback session on the cloud synchronization server 109 if internet access is available and otherwise initiates the media playback session on the local synchronization server 103.

The host digital device 101 computes 204 a time delta representing a time difference between a reference clock and a local clock of the host digital device 101. The reference clock may be, for example, a real-time clock running on a timing server (which may be the synchronization server 109 or another separate server) that is accessible to the host digital device 101. The local clock may deviate from the reference clock due to differences in oscillation frequencies, clock drift, latencies, and other factors. If a connection to the WAN 108 is not available, then the local clock of the host digital device 101 may be used as the reference clock and the time delta for the host digital device 101 set to zero. An example of a process for generating a time delta is further discussed with reference to FIG. 4 below.

The host digital device 101 generates 206 session information data that is used to enable other devices to access and join the synchronized media playback session. The session information may include, for example, an identifier for the reference clock used to compute the time delta, the start time of the media playback session, and a Uniform Resource Identifier (URI) or other identifier that points to a specific location on the cloud synchronization server 109 or the local synchronization server 103 where the media session can be accessed by other devices.

The host digital device 101 receives 208 a selection of media content for synchronizing during the session. For example, the media content may be selected based on a user input or from executing a predefined rule (e.g., automatically selecting the next track in a play list). The selected media content may comprise media stored locally in the local media library 102 of the host digital device 101 or may comprise media stored on the cloud media service 110 that can be accessed and streamed to the host digital device 101.

The host digital device 101 generates 210 a media playback session script comprising a data structure that stores the session information for the session and a plurality of media segments associated with the selected media content. Each media segment contains a media sequence and a frame count. The media sequence specifies a sequence of unique frame numbers assigned to each media frame (e.g., beginning at the start of the media playback session and number sequentially). Here, a media frame represents a time-localized segment of the media content and the frame number may be used (in combination with other information) as a pointer to the corresponding time-localized segment stored in the local media library 102 or the cloud media server 110. The frame count is the number of frames contained in a media segment. For example, a media segment corresponding to 10 frames of an audio track may include a media sequence {1, 2, 3, 4, 5, 6, 7, 8, 9, 10} and a frame count of 10. During playback of media content, the host digital device 101 reads the media playback session script, and sequentially retrieves media frames corresponding to the selected media content as specified by the media segments and media sequences. The segments are then decoded and played. In one embodiment, this script is updated periodically by the host digital device 101 during the media playback session.

The host digital device 101 then makes 212 the media playback session available for other devices to join. For example, if connected to the internet, the host digital device 101 sends the session playback script to the cloud synchronization server 109. The host digital device 101 also broadcasts the media playback session on the local network 105 (e.g., through a protocol such as Bonjour or other service discovery technologies) so that the session may become viewable to guest digital device 107 on the local network 105.

The host digital device 101 begins 214 the playback session. For example, if the selected media content is stored locally in the local media library 102, the host digital device 101 starts serving media segments and media metadata (such as albums covers, artist name, etc.) on request through its local synchronization server 103. If internet access is available to the host digital device 101, the local synchronization server 103 communicates with the cloud synchronization server 109, so that the segmented media content and the metadata are made available at the cloud synchronization server 109. Alternatively, if the host digital device 101 does not have internet access available, the local synchronization server 103 may instead communicate directly to guest devices over the local network 105. If the selected media content is stored at the cloud media service 110 instead of the local media library 102, the cloud synchronization server 109 starts serving media segments and media metadata on request to both the host digital device 101 and any guest devices 107 that joined the session. The host digital device 101 may also then make the segmented media content and the metadata available over the local network 105.

Figure 3:
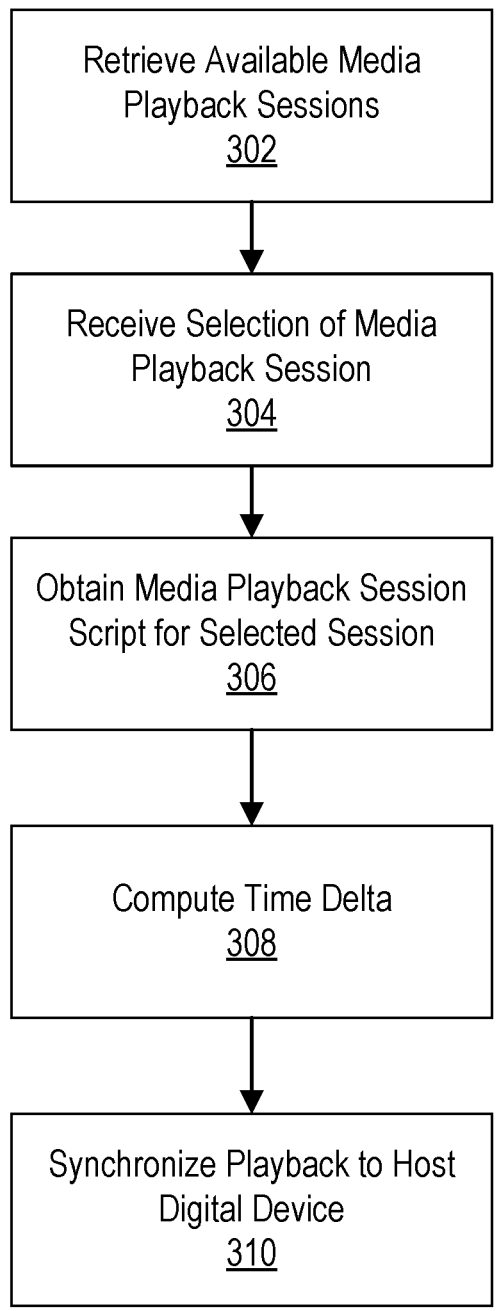
FIG. 3 is a flowchart illustrating an embodiment of a process for joining a media playback session.

FIG. 3 is a flowchart illustrating an embodiment of a process performed by a guest digital device 107 for joining a media playback session. The guest digital device 107 retrieves 302 identifiers for available media playback sessions that it can optionally join. In an embodiment, a discovery process is initiated by a user, for example, by opening a media playback synchronization application. The guest digital device 107 may use a local discovery protocol (e.g., Bonjour) to detect playback sessions that have been made available to join on the local network 105. If internet access is available to the guest digital device 107, the guest digital device 107 may also retrieve a list of available media playback sessions from the cloud synchronization server 109.

The guest digital device 101 receives a selection of a media playback session from the user that the user decides to join. This selection may be communicated by the guest digital device 107 to the host digital device 101 hosting the selected session via the local network 105 or the selection may be communicated by the guest digital device 107 to the cloud synchronization server 109 via the wide area network 108 (or both).

The guest digital device 107 then obtains 306 the media playback script for the selected media playback session. For example, the guest digital device 107 may retrieve the media playback script from the host device local synchronization server 103 if the selected media content for the session is locally stored in the local media library 102 of the host device 101. Alternatively, the guest digital device 107 may retrieve the media playback script from the cloud synchronization server 109 if selected media content is being streamed from the cloud media service 110 and is not hosted on the local network 105.

The guest digital device 107 then computes 308 a time delta relative to the reference clock (as identified in the session information for the selected session). Particularly, the guest digital device 107 determines a difference between its local clock and the reference clock. The guest digital device 107 then synchronizes 310 playback of the media content to the playback on the host digital device 101, as will be described in further detail below. During synchronization, the guest digital device 107 may re-fetch an updated media playback script from the host digital device 101 or cloud synchronization server 109. For example, the guest digital device 107 may obtain an updated media playback script at periodic intervals or when notified in real-time by the host digital device 101 or cloud synchronization server 109 (e.g., via a websocket or push notification) when changes in the media playback script occur. These changes may occur, for example, when the host digital device 101 skips a song, pauses a session, seeks forwards or backwards, or takes other action that affects playback of the media content.

Figure 4:
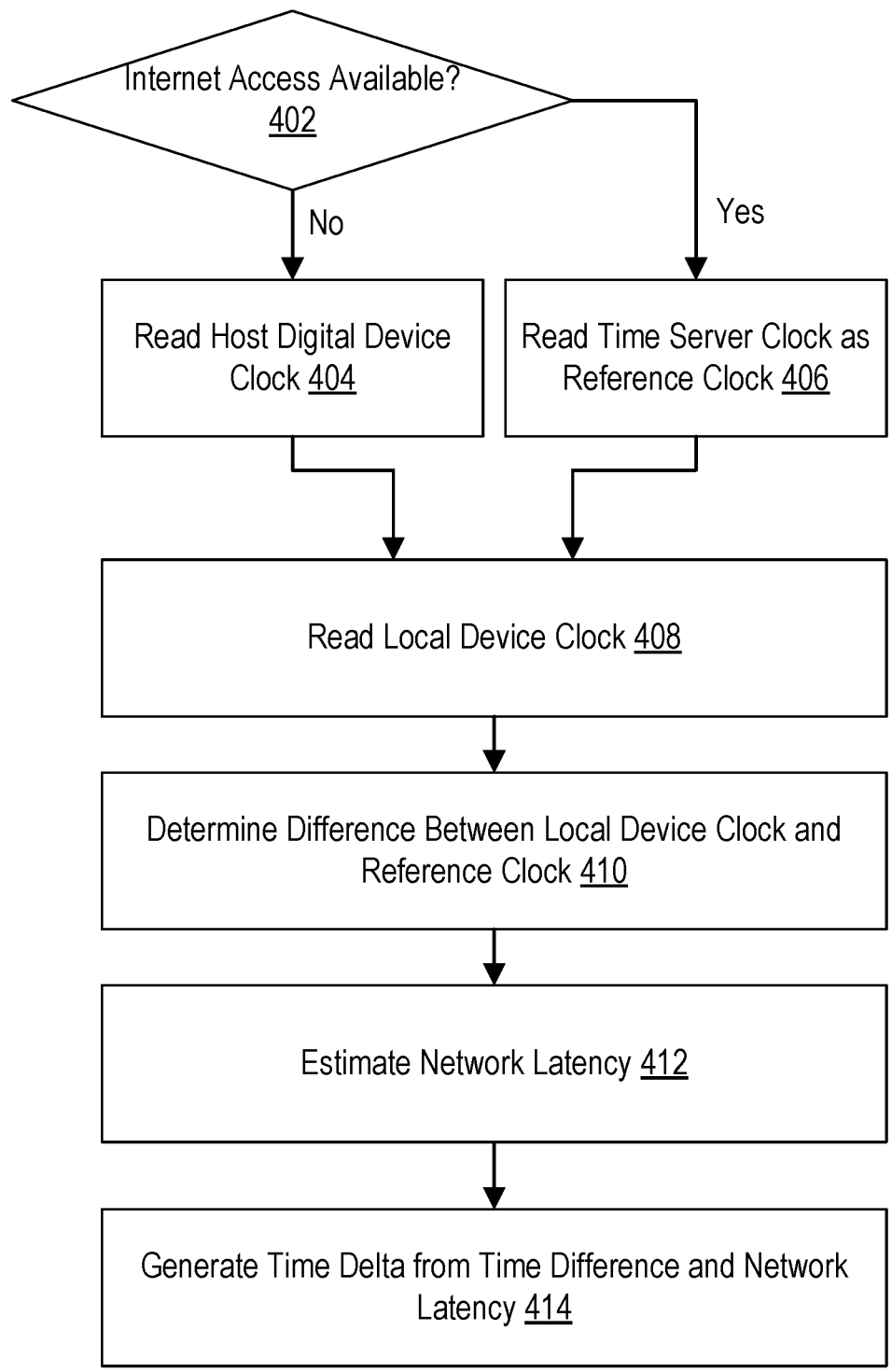
FIG. 4 is a flowchart illustrating an embodiment of a process for computing a time delta used for synchronizing playback of digital media content between devices.

FIG. 4 illustrates a process for determining a time delta between a local device clock and a reference clock. In an embodiment, this process is performed by the guest digital devices 107 when joining a media playback session. The guest digital device 107 determines 402 if internet access is available. If internet access is available, the guest digital device 107 reads 406 a timestamp from a reference clock on a time server (e.g., which may correspond to the cloud synchronization server 109) to serve as the reference time. Otherwise, the guest digital device 107 reads 404 a timestamp from a system clock of the host digital device 101 to serve as the reference time. The guest digital device 107 reads 408 a timestamp from its own system clock. A time difference between the device time and the reference time is computed 410. A network latency is then estimated 412. For example, in one embodiment, the guest digital device 107 may send multiple requests to the time server to get a sequence of timestamps and may compute the network latency as one half the average round-trip time of those requests. The time difference is added to the computed network latency to generate 414 the time delta. The time delta therefore represents an amount of the time that should be added to or subtracted from the device's own system clock in order to be synchronized with the reference clock.

In one embodiment, the host digital device 101 may perform a similar process to the process in FIG. 4 when computing its time delta. However, in the case where no internet access is available, steps 406 and 408-414 may be omitted and the time delta is simply set to zero since the system clock of the host digital device 101 is used as the reference clock.

Figure 5:
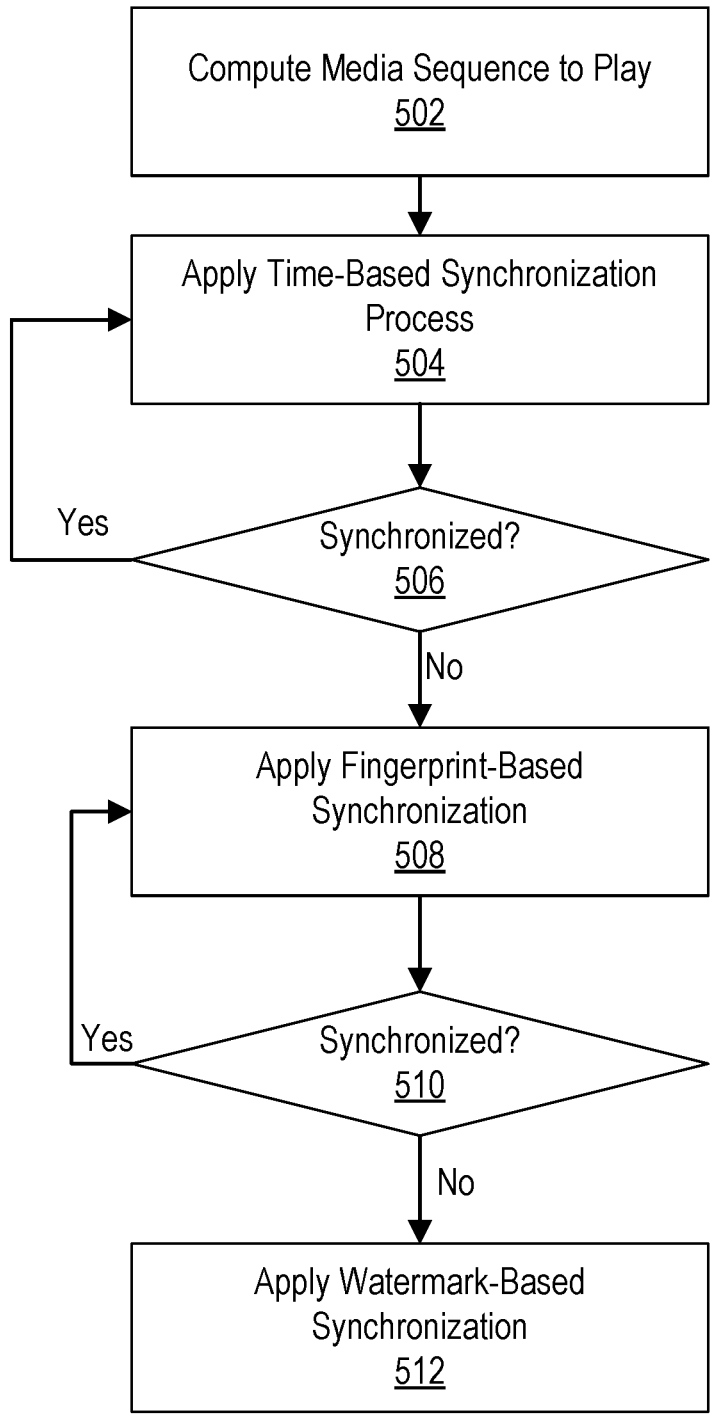
FIG. 5 is a flowchart illustrating an embodiment of a process for synchronizing playback of digital media content according to multiple synchronization techniques.

FIG. 5 illustrates a process for synchronizing media playback of a guest digital device 107 with playback on a host digital device 101 after the guest digital device 107 joins a session hosted by the host digital device 101. The guest digital device 107, after joining the media playback session, computes 502 a media sequence to play. For example, the guest digital device 107 continuously fetches the media playback session script that contains information for performing time-based synchronization, such as the start time of the media session and media session sequences sequentially numbered since the start time of the media session. Using this information, the guest digital device 107 may first compute a media frame duration of the current media playback session by dividing the sample size (representing the number of bytes of a media sample, which is the smallest data chunk of a media content) by the sampling rate. The guest digital device 107 also computes the current session time by subtracting the media session start time from the current time. The guest device 107 furthermore divides the current session time by the media frame duration. This result is the number of frames played since the beginning of the media playback session and thus gives the media sequence that is currently being played by the host digital device 101. In an embodiment, the guest digital device 107 applies 504 time-based synchronization to adjust a playback position of the guest digital device 107 in order to synchronize playback with the host digital device 101. An example of a time-based synchronization process is described in further detail below in FIG. 6.

The guest digital device 107 determines 506 if playback on the guest digital device 107 is sufficiently synchronized with playback on the host digital device 101. In an embodiment, a user can manually indicate lack of synchronization. Absent this indication from the user, the guest digital device 107 may presume playback to be sufficiently synchronized. In another embodiment, a detection mechanism such as a correlation function on sampled ambient audio captured during playback could be used to indicate lack of synchronization by detecting a delay between correlated audio signals. If synchronization is deemed sufficient, the guest digital device 107 continues to synchronize using the time-based synchronization.

If playback is not sufficiently synchronized, the guest digital device 107 applies 508 a fingerprint-based synchronization. Here, the guest digital device 107 captures the ambient audio during playback and analyzes the audio to detect certain features in the audio signal that occur at known times within the audio track. Timing of these detections may be used to determine the playback position of the host digital device 107 and adjust playback of the guest digital device accordingly. An example of a fingerprinted-based synchronization process is described in further detail below in FIG. 7.

The guest digital device 107 determines 510 if playback is sufficiently synchronized while using the fingerprint-based synchronization. If sufficient synchronization is achieved, the guest digital device 107 continues to synchronize according to this process. If sufficient synchronization is not achieved, a watermark-based synchronization process may be applied 512. Here, watermarks (e.g., one or more bytes of data) are actively inserted in the audio stream of the host digital device 101 at known time locations. The guest digital device 107 records ambient audio during playback and detects the timing of the watermarks. Playback of the guest digital device 107 can then be adjusted accordingly. An example of a watermark-based synchronization process is described in further detail below in FIG. 8.

Figure 6:
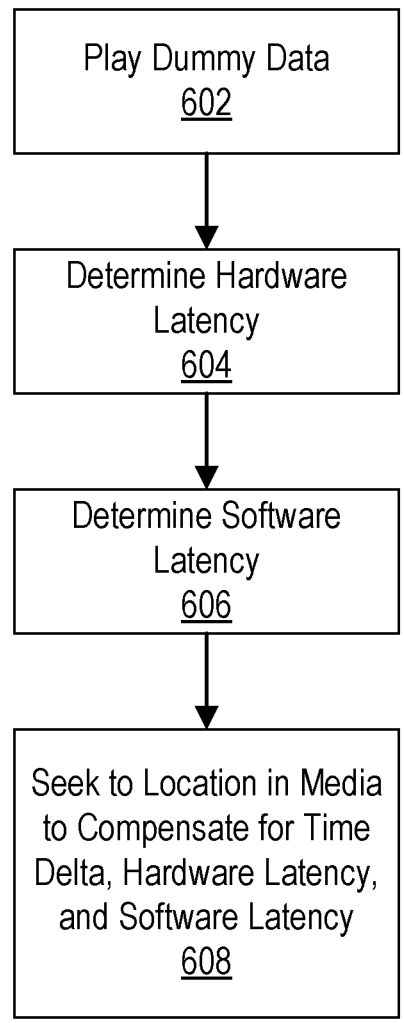
FIG. 6 is a flowchart illustrating an embodiment of a process for synchronizing playback of digital media content according to a time-based technique.

FIG. 6 illustrates an example of a time-based synchronization method performed by a guest digital device 107. Prior to playing the selected audio content, the guest digital device 107 plays 602 some dummy data in order to warm up the media playback stack so that potential latency is minimized. In an embodiment, this dummy data can be silent audio content. In another embodiment, this data can be black video content with silent audio content. The guest digital device 107 determines 604 its hardware latency. For example, in an embodiment, hardware latency can be found by performing a lookup in a local or cloud database that stores latency information for different types of devices. In another embodiment, the hardware latency is determined from a latency computation algorithm performed by the guest digital device 107. The guest digital device 107 also determines 606 its software latency. Software latency can include delays from, for example, media decompression, buffering and conversion of media to a natively playable format. In an embodiment, software latency can be determined prior to playback of the selected media session based on analysis of playback parameters associated with playing the dummy data. For example, the guest digital device 107 may determine software latency by sending marked media segments to the media playback stack. The marked media segments include watermarks at known time intervals. When the first marked media segment is played, the guest digital device 107 captures the audio and identifies the timing of the watermarks. The difference between the detection time and the playback start time can be used to compute the software latency of the media playback stack. In alternative embodiments, the software latency may be updated in real-time during playback based on analysis of the audio.

During playback, the guest digital device 107 seeks 608 in the media playback buffer to determine a playback position that compensates for the time delta, the hardware latency, and the software latency to achieve synchronized playback. For example, the guest digital device 107 determines a current playback time by determining the time elapsed on its local system clock since the start time of the media playback session (obtained from the session information), and then adjusts the current playback time based on the time delta, software latency, and hardware latency. The guest digital device 107 then determines how many frames have played on the host digital device 101 since the beginning of the playback session by dividing the adjusted current time into the session by the media frame duration. The guest digital device 107 then seeks to current frame to synchronize playback with the host digital device 101.

Figure 7:
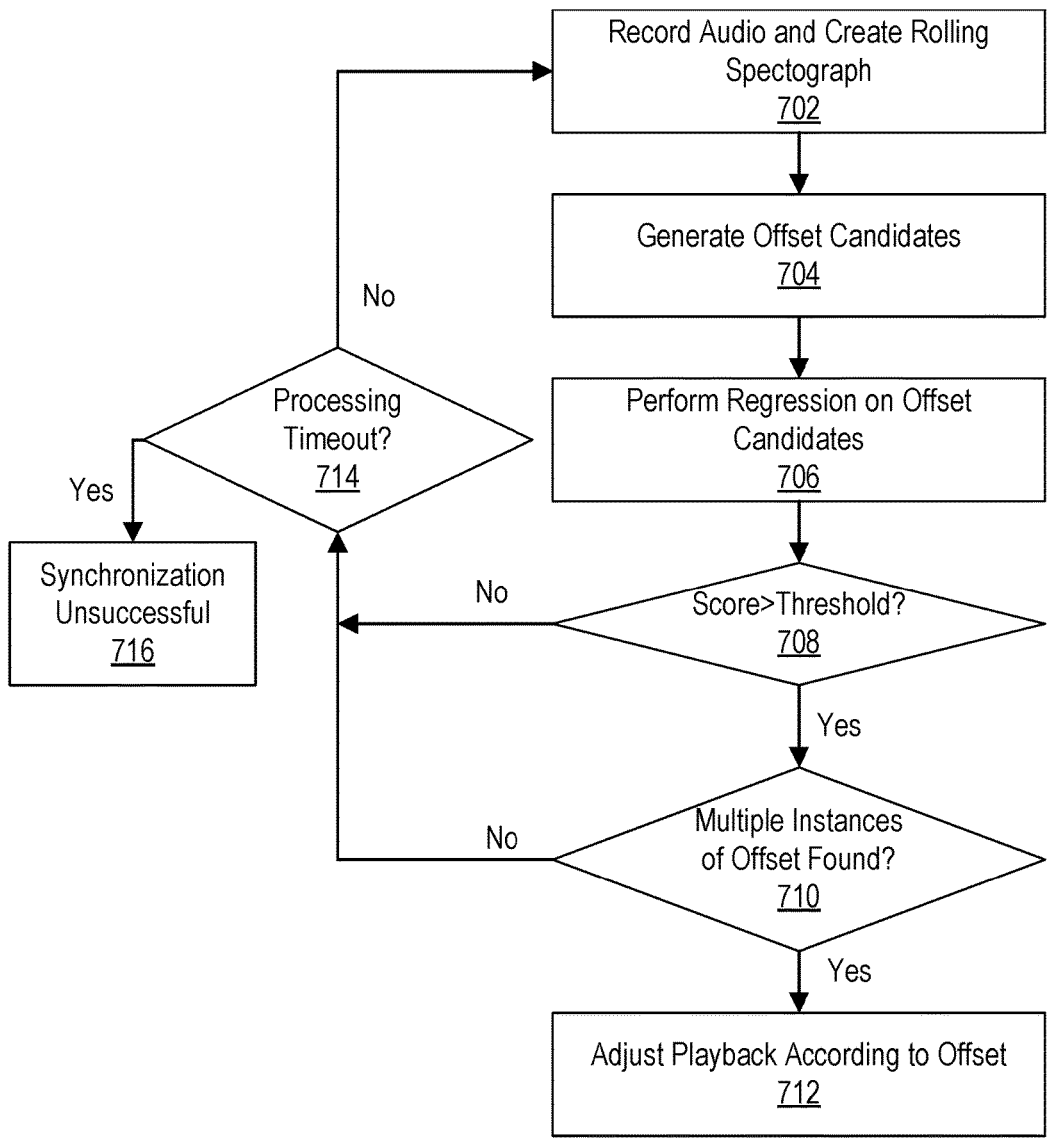
FIG. 7 is a flowchart illustrating an embodiment of a process for synchronizing playback of digital media content according to a fingerprint-based technique.

FIG. 7 illustrates an embodiment of a process for performing fingerprint-based synchronization. The guest digital device 107 records 702 ambient audio using its microphone to generate audio data and a rolling spectrograph is created. The rolling spectrograph may represent, for each of a plurality of time steps, amplitudes of different frequencies in the audio. For example, in an embodiment, an FFT transformation is applied to the recorded audio data. The result of the FFT transformation provides audio amplitude data for each frequency at each time step of the recording. In an embodiment, a Hanning window function is applied to perform the FFT transformation. The resulting data is placed into a ring-buffer that stores the rolling spectrograph. The guest digital device 107 generates 704 offset candidates from the rolling spectrograph in which each offset candidate represents a possible time delay between the playback position of the host digital device 101 and the guest digital device 107. For example, in one embodiment, an offset detection algorithm executes on the rolling spectrogram. Here, a normalized differential spectrogram is created. This normalized differential spectrogram represents, at each time step, the values of magnitudes of each frequency at the time step minus the magnitudes of frequencies at the previous time step. The guest digital device 107 identifies from the normalized differential spectrogram, steps where a notable amplitude variations (e.g., above a threshold step size) is found. The time locations corresponding to the notable variations that exceed a threshold step size are defined as peaks. For each peak identified in the normalized differential spectrogram, two or more offset candidates are generated and compared to the peak. Offset candidates are the combination of all possible pairs of peaks, and the distance between peaks within a pair represents the time offset for the offset candidate. As an example, if peak 1 is found at t=15 millisecond, and peak 2 is found at t=100 milliseconds and peak 3 found at t=150 milliseconds, the following offset candidates are generated: 1) Peak 1+Peak 2, giving an offset of 85 ms; 2) Peak 1+Peak 3, giving an offset of 135 ms; Peak 2+Peak 3, giving an offset of 50 ms. The offset candidates therefore represent the different possible offsets between the host playback position and the guest playback position.

A regression is then performed 706 on features corresponding to each offset candidate. For example for each offset candidate, features are extracted from the comparison of the two peaks and then aggregated by offset candidate into buckets. Features can be, but are not limited to, the number of peaks found for a particular offset, similarity of the starting position in the high frequencies, similarity of the starting position in the low frequencies, or similarity of the peaks magnitudes. In an embodiment, for each histogram bucket, the summed features are passed into a previously trained logistic regression model. This model gives the probability that the peaks offset correspond to the offset between the same audio data being played at different positions and thus represent the synchronization offset between the host digital device 101 and the guest digital device 107.

The guest digital device 107 determines 708 if the offset having the highest logistic regression score is higher than a predefined threshold (e.g., defined by a scoring model). If an offset has a score exceeding the threshold, the guest digital device 107 determines 710 if that offset value has been measured multiple times between different peaks. If multiple measurements of the same offset value are found, the guest digital device 107 adjusts 712 playback by seeking into its media playback buffer in order to compensate for the offset. Otherwise, if no offset is found that exceeds the threshold or if multiple measurements of the same offset exceeding the threshold are not found, the guest digital device 107 determines 714 if a processing timeout has occurred due to the processing time for the process of FIG. 7 exceeding a predefined time limitation. If no timeout has occurred, the guest digital device 107 returns to step 702 to continue analyzing the audio. Otherwise, when the processing timeout occurs, the guest digital device 107 determines 716 that the fingerprint-based synchronization is unsuccessful.

Figure 8:
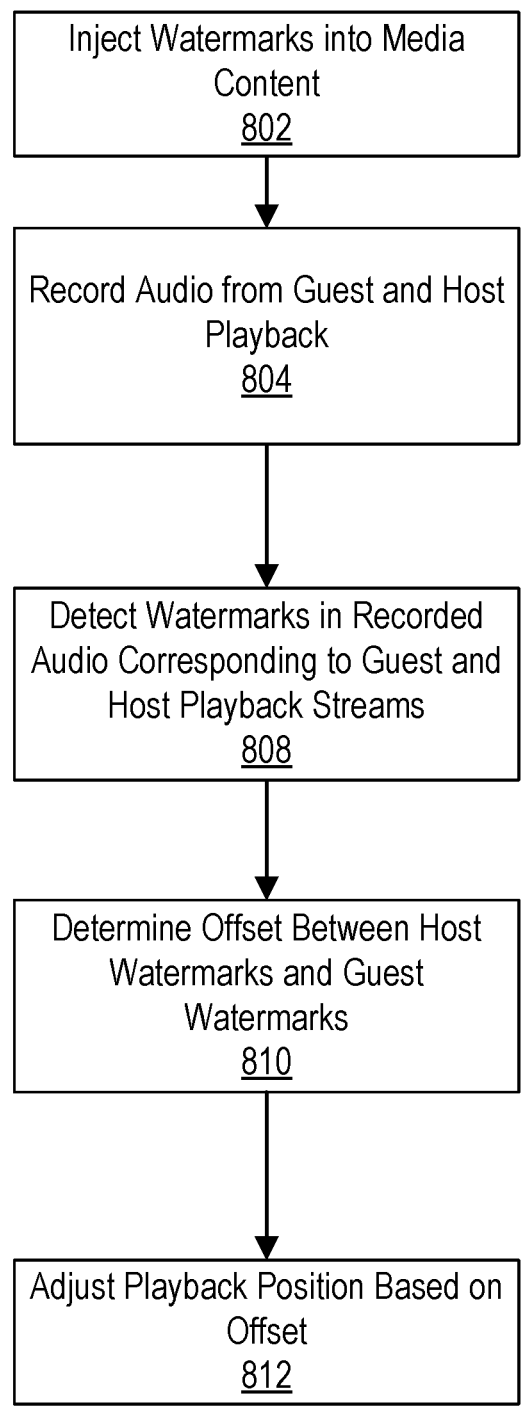
FIG. 8 is a flowchart illustrating an embodiment of a process for synchronizing playback of digital media content according to a watermark-based technique.

FIG. 8 illustrates an embodiment of a watermark-based synchronization method. The guest digital device 107 injects 802 watermarks at predefined time positions within the media content. The watermark represents data inserted into the audio stream that can be detected in a recording of the played audio. In one embodiment, the data is such that it can be detected by a machine but does not impact the quality of the audio in a way that is audible to humans. For example, in one embodiment, a watermark is made of seven bits of data which are inserted in the media content at specific media sequences. The watermarks may span multiple time steps of a pre-defined length, and span multiple frequencies for redundancy. In an embodiment, the first and last marker bits are always set to 1 and the other bits are used to encode an identifier for the media sequence in which the watermark is injected.

The host digital device 101 similarly injects watermarks into its media content. In an embodiment, the host device 101 and the guest device 107 do not inject their respective markers at the same media sequence and instead randomize their respective positions.

The guest digital device 107 records 804 ambient audio while the guest digital device 107 and host digital device 101 play the media content. The guest digital device 107 then detects 808 the watermarks in the recorded audio based on an analysis of the host and guest playback streams. The time offset between the positions of the watermarks is determined 810. Since the markers indicate the media sequence being played on each device, the offset between both devices can be retrieved by comparing both media sequence identifiers. The guest digital device 107 may then adjust 812 the playback position based on the detected offset.

In one embodiment, the guest digital device 107 may adjust playback position only if the offset is above a predefined threshold. Otherwise, once the offset falls below the threshold, the guest digital device 107 may deem the playback synchronized.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for the embodiments herein through the disclosed principles. Thus, while particular embodiments and applications have been illustrated and described, it is to be understood that the disclosed embodiments are not limited to the precise construction and components disclosed herein. Various apparent modifications, changes, and variations may be made in the arrangement, operation and details of the method and apparatus disclosed herein without departing from the scope defined in the appended claims.

The invention claimed is:

1. A computer-implemented method for synchronizing playback of guest media content played by a guest digital device with playback of host audio media content played on a host digital device, the method comprising: determining, by the guest digital device, a time delta representing an offset between a local system clock of the guest digital device and a reference clock; receiving, by the guest digital device, playback information specifying media content being played by the host digital device, a media playback start time representing a start time of the media playback on the host digital device relative to the reference clock, and a media playback session script, the media playback session script comprising a media sequence indicating a sequence of frames of the media content; determining, based on the media playback start time, a current time of the local system clock of the guest digital device, and the media playback session script, an estimated playback position of the host digital device within a current media sequence; determining a latency of the guest digital device representing a time between initializing playback of a media sequence and outputting the media sequence; adjusting the estimated playback position of the guest digital device to compensate for the time delta and the latency to generate a time-adjusted playback position; and outputting the media content on the guest digital device according to the playback session script and the time-adjusted playback position.

2. The computer-implemented method of claim 1, further comprising: responsive to detecting a lack of synchronization between playback of the media content from the guest digital device and the host digital device: recording, by the guest digital device, audio including ambient audio originating from the guest digital device and ambient audio originating from the host digital device; detecting a time difference between corresponding features in the recorded audio; adjusting the time-adjusted playback position of the media content on the guest digital device based on the time difference.

3. The computer-implemented method of claim 2, wherein detecting the time difference between the corresponding features in the record audio comprises: generating a rolling spectrogram from the recorded audio; analyzing the rolling spectrogram to identify time-locations of peaks in the rolling spectrogram; determining candidate offsets from time differences between pairs of the peaks; performing a regression to generate scores for each of the candidate offsets; and determining a most likely offset based on the scores.

4. The computer-implemented method of claim 1, further comprising: responsive to detecting a lack or loss of synchronization between playback of the media content from the guest digital device and the host digital device: inserting a watermark into the media content at a given time position; recording, by the guest digital device, audio including ambient audio originating from the guest digital device and ambient audio originating from the host digital device; detecting a time difference between detected time locations of the watermark in the recorded audio; adjusting the time-adjusted playback position of the media content on the guest digital device based on the time difference.

5. The computer-implemented method of claim 1, further comprising: receiving, from the host digital device, a time adjustment in a playback position of the media content; and adjusting the playback position of the media content on the guest digital device based on the time adjustment received from the host digital device.

6. The computer-implemented method of claim 1, wherein the watermark encodes an identifier of the media sequence in which the watermark is inserted.

7. The computer-implemented method of claim 1, wherein determining the time delta comprises: reading a timestamp from a reference clock; reading a timestamp from a local system clock of the guest digital device; determining a time difference between the timestamp from the reference clock and the timestamp from the local system clock; estimating a network latency associated with retrieving the timestamp from the reference clock; and generating the time delta by adjusting the time difference based on the network latency.

8. The computer-implemented method of claim 1, wherein determining the estimated playback position of the host digital device within a current media sequence comprises: determining a current session playback time; determining a media frame duration; determining a current frame number based on the current session playback time and the media frame duration; and determining the estimated playback position from the current frame number.

9. A non-transitory computer-readable storage medium storing instructions for synchronizing playback of guest media content played by a guest digital device with playback of host audio media content played on a host digital device, the instructions when executed causing a processor to perform steps including: determining a time delta representing an offset between a local system clock of the guest digital device and a reference clock; receiving playback information specifying media content being played by the host digital device, a media playback start time representing a start time of the media playback on the host digital device relative to the reference clock, and a media playback session script, the media playback session script comprising a media sequence indicating a sequence of frames of the media content; determining, based on the media playback start time, a current time of the local system dock of the guest digital device, and the media playback session script, an estimated playback position of the host digital device within a current media sequence; determining a latency of the guest digital device representing a time between initializing playback of a media sequence and outputting the media sequence; adjusting the estimated playback position of the guest digital device to compensate for the time delta and the latency to generate a time-adjusted playback position; and outputting the media content according to the playback session script and the time-adjusted playback position.

10. The non-transitory computer, readable storage medium of claim 9, the instructions when executed further causing the processor to perform steps including: responsive to detecting a lack of synchronization between playback of the media content from the guest digital device and the host digital device: recording, by the guest digital device, audio including ambient audio originating from the guest digital device and ambient audio originating from the host digital device; detecting a time difference between corresponding features in the recorded audio; adjusting the time-adjusted playback position of the media content on the guest digital device based on the time difference.

11. The non-transitory computer-readable storage medium of claim 10, the instructions when executed further causing the processor to perform steps including: generating a rolling spectrogram from the recorded audio; analyzing the rolling spectrogram to identify time-locations of peaks in the rolling spectrogram; determining candidate offsets from time differences between pairs of the peaks; performing a regression to generate scores for each of the candidate offsets; and determining a most likely offset based on the scores.

12. The non-transitory computer-readable storage medium of claim 9, further comprising: responsive to detecting a lack or loss of synchronization between playback of the media content from the guest digital device and the host digital device: inserting a watermark into the media content at a given time position; recording, by the guest digital device, audio including ambient audio originating from the guest digital device and ambient audio originating from the host digital device; detecting a time difference between detected time locations of the watermark in the recorded audio; adjusting the time-adjusted playback position of the media content on the guest digital device based on the time difference.

13. The non-transitory computer-readable storage medium of claim 9, wherein the instructions when executed furthercause the processor to perform steps including: receiving, from the host digital device, a time adjustment in a playback position of the media content; and adjusting the playback position of the media content on the guest digital device based on the time adjustment received from the host digital device.

14. The non-transitory computer-readable storage medium of claim 9, wherein the watermark encodes an identifier of the media sequence in which the watermark is inserted.

15. The non-transitory computer-readable storage medium of claim 9, wherein determining the time delta comprises: reading a timestamp from a reference clock; reading a timestamp from a local system clock of the guest digital device; determining a time difference between the timestamp from the reference clock and the timestamp from the local system clock; estimating a network latency associated with retrieving the timestamp from the reference clock; and generating the time delta by adjusting the time difference based on the network latency.

16. The non-transitory computer-readable storage medium of claim 9, wherein determining the estimated playback position of the host digital device within a current media sequence comprises: determining a current session playback time; determining a media frame duration; determining a current frame number based on the current session playback time and the media frame duration; and determining the estimated playback position from the current frame number.

17. A computing device for synchronizing playback of guest media content with playback of host media content played on a host digital device, the computing device comprising: an audio playback device; a processor; and a non-transitory computer-readable storage medium storing instructions that when executed cause the processor to perform steps including: determining a time delta representing an offset between a local system clock of the guest digital device and a reference clock; receiving playback information specifying media content being played by the host digital device, a media playback start time representing a start time of the media playback on the host digital device relative to the reference dock, and a media playback session script, the media playback session script comprising a media sequence indicating a sequence of frames of the media content; determining, based on the media playback start time, a current time of the local system clock of the guest digital device, and the media playback session script, an estimated playback position of the host digital device within a current media sequence; determining a latency of the guest digital device representing a time between initializing playback of a media sequence and outputting the media sequence; adjusting the estimated playback position of the guest digital device to compensate for the time delta and the latency to generate a time-adjusted playback position; and outputting the media content to the audio playback device according to the playback session script and the time-adjusted playback position.

18. The computing device of claim 17, the instructions when executed further causing the processor to perform steps including: responsive to detecting a lack of synchronization between playback of the media content from the guest digital device and the host digital device: recording, by the guest digital device, audio including ambient audio originating from the guest digital device and ambient audio originating from the host digital device; detecting a time difference between corresponding features in the recorded audio; adjusting the time-adjusted playback position of the media content on the guest digital device based on the time difference.

19. The computing device of claim 18, the instructions when executed further causing the processor to perform steps including: generating a rolling spectrogram from the recorded audio; analyzing the rolling spectrogram to identify time-locations of peaks in the rolling spectrogram; determining candidate offsets from time differences between pairs of the peaks; performing a regression to generate scores for each of the candidate offsets; and determining a most likely offset based on the scores.

20. The computing device of claim 17, further comprising: responsive to detecting a lack or loss of synchronization between playback of the media content from the guest digital device and the host digital device: inserting a watermark into the media content at a given time position; recording, by the guest digital device, audio including ambient audio originating from the guest digital device and ambient audio originating from the host digital device; detecting a time difference between detected time locations of the watermark in the recorded audio; adjusting the time-adjusted playback position of the media content on the guest digital device based on the time difference.

* * * * *

UNITED STATES PATENT AND TRADEMARK OFFICE
CERTIFICATE OF CORRECTION

PATENT NO. : 10,382,511 B2
APPLICATION NO. : 15/441020
DATED : August 13, 2019
INVENTOR(S) : Martin-Luc Archambault et al.

Page 1 of 1

It is certified that error appears in the above-identified patent and that said Letters Patent is hereby corrected as shown below:

Claim 9, Column 13, Line 40, delete "local system dock" and insert --local system clock--.

Signed and Sealed this
Twenty-first Day of January, 2020

Andrei Iancu
*Director of the United States Patent and Trademark Office*